(12) United States Patent
Garrity et al.

(10) Patent No.: US 8,520,414 B2
(45) Date of Patent: Aug. 27, 2013

(54) CONTROLLER FOR A POWER CONVERTER

(75) Inventors: Paul Garrity, Rockwall, TX (US);
Zaohong Yang, Richardson, TX (US)

(73) Assignee: Power Systems Technologies, Ltd., Ebene (MU)

( * ) Notice: Subject to any disclaimer, the term of this patent is extended or adjusted under 35 U.S.C. 154(b) by 2 days.

(21) Appl. No.: 12/689,771

(22) Filed: Jan. 19, 2010

(65) Prior Publication Data
US 2010/0182806 A1 Jul. 22, 2010

Related U.S. Application Data

(60) Provisional application No. 61/145,654, filed on Jan. 19, 2009.

(51) Int. Cl.
*H02M 3/335* (2006.01)

(52) U.S. Cl.
USPC ...................................... 363/21.14

(58) Field of Classification Search
USPC ........... 363/21.12, 21.13, 21.14, 21.15, 21.18
See application file for complete search history.

(56) References Cited

U.S. PATENT DOCUMENTS

| | | | |
|---|---|---|---|
| 1,376,978 A | 5/1921 | Stoekle | |
| 2,473,662 A | 6/1949 | Pohm | |
| 3,007,060 A | 10/1961 | Guenther | |
| 3,346,798 A | 10/1967 | Dinger | |
| 3,358,210 A | 12/1967 | Grossoehme | |
| 3,433,998 A | 3/1969 | Woelber | |
| 3,484,562 A | 12/1969 | Kronfeld | |
| 3,553,620 A | 1/1971 | Cielo et al. | |
| 3,602,795 A | 8/1971 | Gunn | |
| 3,622,868 A | 11/1971 | Todt | |
| 3,681,679 A | 8/1972 | Chung | |
| 3,708,742 A | 1/1973 | Gunn | |

(Continued)

FOREIGN PATENT DOCUMENTS

| | | |
|---|---|---|
| CN | 101141099 | 3/2008 |
| CN | 201252294 | 6/2009 |

(Continued)

OTHER PUBLICATIONS

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

(Continued)

*Primary Examiner* — Nguyen Tran
(74) *Attorney, Agent, or Firm* — Boisbrun Hofman, PLLC (57) ABSTRACT

A controller for a power converter having a transformer T1 with a primary winding coupled to a power switch SW and a secondary winding coupled to a synchronous rectifier switch SR. In one embodiment, the controller includes a first controller configured to control a conductivity of the power switch SW, and a first delay circuit configured to delay an initiation of the conductivity of the power switch SW. The controller also includes a second controller configured to control a conductivity of the synchronous rectifier switch SR as a function of a voltage difference between two terminals thereof, and a second delay circuit configured to delay an initiation of the conductivity of the synchronous rectifier switch SR. The controller still further includes a shutdown circuit configured to substantially disable conductivity of the synchronous rectifier switch SR before the initiation of conductivity of the power switch SW.

20 Claims, 4 Drawing Sheets

(56) References Cited

U.S. PATENT DOCUMENTS

| | | |
|---|---|---|
| 3,708,744 A | 1/1973 | Stephens et al. |
| 4,019,122 A | 4/1977 | Ryan |
| 4,075,547 A | 2/1978 | Wroblewski |
| 4,202,031 A | 5/1980 | Hesler et al. |
| 4,257,087 A | 3/1981 | Cuk |
| 4,274,071 A | 6/1981 | Pfarre |
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,613,841 A | 9/1986 | Roberts |
| 4,636,823 A | 1/1987 | Margalit et al. |
| 4,660,136 A | 4/1987 | Montorefano |
| 4,770,667 A | 9/1988 | Evans et al. |
| 4,770,668 A | 9/1988 | Skoultchi et al. |
| 4,785,387 A | 11/1988 | Lee et al. |
| 4,799,138 A | 1/1989 | Chahabadi et al. |
| 4,803,609 A | 2/1989 | Gillett et al. |
| 4,823,249 A | 4/1989 | Garcia, II |
| 4,837,496 A | 6/1989 | Erdi |
| 4,866,367 A | 9/1989 | Ridley et al. |
| 4,887,061 A | 12/1989 | Matsumura |
| 4,899,271 A | 2/1990 | Seiersen |
| 4,903,089 A | 2/1990 | Hollis et al. |
| 4,922,400 A | 5/1990 | Cook |
| 4,962,354 A | 10/1990 | Visser et al. |
| 4,964,028 A | 10/1990 | Spataro |
| 4,999,759 A | 3/1991 | Cavagnolo et al. |
| 5,003,277 A | 3/1991 | Sokai et al. |
| 5,014,178 A | 5/1991 | Balakrishnan |
| 5,027,264 A | 6/1991 | DeDoncker et al. |
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,172,309 A | 12/1992 | DeDoncker et al. |
| 5,177,460 A | 1/1993 | Dhyanchand et al. |
| 5,182,535 A | 1/1993 | Dhyanchand |
| 5,204,809 A | 4/1993 | Andresen |
| 5,206,621 A | 4/1993 | Yerman |
| 5,208,739 A | 5/1993 | Sturgeon |
| 5,223,449 A | 6/1993 | Morris et al. |
| 5,225,971 A | 7/1993 | Spreen |
| 5,231,037 A | 7/1993 | Yuan et al. |
| 5,244,829 A | 9/1993 | Kim |
| 5,262,930 A | 11/1993 | Hua et al. |
| 5,282,126 A | 1/1994 | Husgen |
| 5,285,396 A | 2/1994 | Aoyama |
| 5,291,382 A | 3/1994 | Cohen |
| 5,303,138 A | 4/1994 | Rozman |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,343,140 A | 8/1994 | Gegner |
| 5,353,001 A | 10/1994 | Meinel et al. |
| 5,369,042 A | 11/1994 | Morris et al. |
| 5,374,887 A | 12/1994 | Drobnik |
| 5,399,968 A | 3/1995 | Sheppard et al. |
| 5,407,842 A | 4/1995 | Morris et al. |
| 5,459,652 A | 10/1995 | Faulk |
| 5,468,661 A | 11/1995 | Yuan et al. |
| 5,477,175 A | 12/1995 | Tisinger et al. |
| 5,508,903 A | 4/1996 | Alexndrov |
| 5,523,673 A | 6/1996 | Ratliff et al. |
| 5,539,630 A | 7/1996 | Pietkiewicz et al. |
| 5,554,561 A | 9/1996 | Plumton |
| 5,555,494 A | 9/1996 | Morris |
| 5,610,085 A | 3/1997 | Yuan et al. |
| 5,624,860 A | 4/1997 | Plumton et al. |
| 5,663,876 A | 9/1997 | Newton et al. |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,383 A | 9/1998 | Lei |
| 5,815,386 A | 9/1998 | Gordon |
| 5,864,110 A | 1/1999 | Moriguchi et al. |
| 5,870,299 A | 2/1999 | Rozman |
| 5,880,942 A | 3/1999 | Leu |
| 5,886,508 A | 3/1999 | Jutras |
| 5,889,298 A | 3/1999 | Plumton et al. |
| 5,889,660 A | 3/1999 | Taranowski et al. |
| 5,900,822 A | 5/1999 | Sand et al. |
| 5,907,481 A | 5/1999 | Svardsjo |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,929,665 A | 7/1999 | Ichikawa et al. |
| 5,933,338 A | 8/1999 | Wallace |
| 5,940,287 A | 8/1999 | Brkovic |
| 5,946,207 A * | 8/1999 | Schoofs ............... 363/127 |
| 5,956,245 A | 9/1999 | Rozman |
| 5,956,578 A | 9/1999 | Weitzel et al. |
| 5,959,850 A * | 9/1999 | Lim ..................... 363/17 |
| 5,977,853 A | 11/1999 | Ooi et al. |
| 5,999,066 A | 12/1999 | Saito et al. |
| 5,999,429 A | 12/1999 | Brown |
| 6,003,139 A | 12/1999 | McKenzie |
| 6,008,519 A | 12/1999 | Yuan et al. |
| 6,011,703 A | 1/2000 | Boylan et al. |
| 6,038,154 A | 3/2000 | Boylan et al. |
| 6,046,664 A | 4/2000 | Weller et al. |
| 6,055,166 A | 4/2000 | Jacobs et al. |
| 6,060,943 A | 5/2000 | Jansen |
| 6,067,237 A | 5/2000 | Nguyen |
| 6,069,798 A | 5/2000 | Liu |
| 6,069,799 A | 5/2000 | Bowman et al. |
| 6,078,510 A | 6/2000 | Spampinato et al. |
| 6,084,792 A | 7/2000 | Chen et al. |
| 6,094,038 A | 7/2000 | Lethellier |
| 6,097,046 A | 8/2000 | Plumton |
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumura |
| 6,320,490 B1 | 11/2001 | Clayton |
| 6,323,090 B1 | 11/2001 | Zommer |
| 6,325,035 B1 | 12/2001 | Codina et al. |
| 6,344,986 B1 | 2/2002 | Jain et al. |
| 6,345,364 B1 | 2/2002 | Lee |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |

| | | | |
|---|---|---|---|
| 6,373,727 B1 * | 4/2002 | Hedenskog et al. ........ 363/21.14 |
| 6,373,734 B1 | 4/2002 | Martinelli |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,400,579 B2 | 6/2002 | Cuk |
| 6,414,578 B1 | 7/2002 | Jitaru |
| 6,438,009 B2 | 8/2002 | Assow |
| 6,462,965 B1 | 10/2002 | Uesono |
| 6,466,461 B2 | 10/2002 | Mao et al. |
| 6,469,564 B1 | 10/2002 | Jansen |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,580,627 B2 | 6/2003 | Toshio |
| 6,608,768 B2 | 8/2003 | Sula |
| 6,611,132 B2 | 8/2003 | Nakagawa et al. |
| 6,614,206 B1 | 9/2003 | Wong et al. |
| 6,654,259 B2 | 11/2003 | Koshita et al. |
| 6,661,276 B1 | 12/2003 | Chang |
| 6,668,296 B1 | 12/2003 | Dougherty et al. |
| 6,674,658 B2 | 1/2004 | Mao et al. |
| 6,683,797 B2 | 1/2004 | Zaitsu et al. |
| 6,687,137 B1 | 2/2004 | Yasumura |
| 6,696,910 B2 | 2/2004 | Nuytkens et al. |
| 6,731,486 B2 | 5/2004 | Holt et al. |
| 6,741,099 B1 | 5/2004 | Krugly |
| 6,751,106 B2 | 6/2004 | Zhang et al. |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,856,149 B2 | 2/2005 | Yang |
| 6,862,194 B2 | 3/2005 | Yang et al. |
| 6,867,678 B2 | 3/2005 | Yang |
| 6,867,986 B2 | 3/2005 | Amei |
| 6,873,237 B2 | 3/2005 | Chandrasekaran et al. |
| 6,882,548 B1 | 4/2005 | Jacobs et al. |
| 6,906,934 B2 | 6/2005 | Yang et al. |
| 6,943,553 B2 | 9/2005 | Zimmermann et al. |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim et al. |
| 7,075,799 B2 | 7/2006 | Qu |
| 7,076,360 B1 | 7/2006 | Ma |
| 7,095,638 B2 | 8/2006 | Uusitalo |
| 7,098,640 B2 | 8/2006 | Brown |
| 7,099,163 B1 | 8/2006 | Ying |
| 7,148,669 B2 | 12/2006 | Maksimovic et al. |
| 7,170,268 B2 | 1/2007 | Kim |
| 7,176,662 B2 | 2/2007 | Chandrasekaran |
| 7,209,024 B2 | 4/2007 | Nakahori |
| 7,269,038 B2 | 9/2007 | Shekhawat et al. |
| 7,280,026 B2 | 10/2007 | Chandrasekaran et al. |
| 7,285,807 B2 | 10/2007 | Brar et al. |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 | 2/2008 | Iwai |
| 7,339,208 B2 | 3/2008 | Brar et al. |
| 7,339,801 B2 | 3/2008 | Yasumura |
| 7,348,612 B2 | 3/2008 | Sriram et al. |
| 7,360,004 B2 | 4/2008 | Dougherty et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,385,375 B2 | 6/2008 | Rozman |
| 7,386,404 B2 | 6/2008 | Cargonja et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,446,512 B2 | 11/2008 | Nishihara et al. |
| 7,447,049 B2 | 11/2008 | Garner et al. |
| 7,462,891 B2 | 12/2008 | Brar et al. |
| 7,468,649 B2 | 12/2008 | Chandrasekaran |
| 7,471,523 B2 | 12/2008 | Yang |
| 7,489,225 B2 | 2/2009 | Dadafshar |
| 7,499,295 B2 | 3/2009 | Indika de Silva et al. |
| 7,541,640 B2 | 6/2009 | Brar et al. |
| 7,554,430 B2 | 6/2009 | Mehrotra et al. |
| 7,558,037 B1 | 7/2009 | Gong et al. |
| 7,558,082 B2 | 7/2009 | Jitaru |
| 7,567,445 B2 | 7/2009 | Coulson et al. |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manabe et al. |
| 7,733,679 B2 | 6/2010 | Luger et al. |
| 7,746,041 B2 | 6/2010 | Xu et al. |
| 7,778,050 B2 | 8/2010 | Yamashita |
| 7,778,051 B2 | 8/2010 | Yang |
| 7,787,264 B2 | 8/2010 | Yang et al. |
| 7,791,903 B2 | 9/2010 | Zhang et al. |
| 7,795,849 B2 | 9/2010 | Sohma |
| 7,813,101 B2 | 10/2010 | Morikawa |
| 7,847,535 B2 | 12/2010 | Meynard et al. |
| 7,876,191 B2 | 1/2011 | Chandrasekaran et al. |
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,179,699 B2 | 5/2012 | Tumminaro et al. |
| 2002/0057080 A1 | 5/2002 | Telefus et al. |
| 2002/0101741 A1 | 8/2002 | Brkovic |
| 2002/0110005 A1 | 8/2002 | Mao et al. |
| 2002/0114172 A1 | 8/2002 | Webb et al. |
| 2003/0026115 A1 * | 2/2003 | Miyazaki ........................ 363/53 |
| 2003/0197585 A1 | 10/2003 | Chandrasekaran et al. |
| 2003/0198067 A1 | 10/2003 | Sun et al. |
| 2004/0017689 A1 | 1/2004 | Zhang et al. |
| 2004/0034555 A1 | 2/2004 | Dismukes et al. |
| 2004/0148047 A1 | 7/2004 | Dismukes et al. |
| 2004/0156220 A1 | 8/2004 | Kim et al. |
| 2004/0200631 A1 | 10/2004 | Chen |
| 2004/0217794 A1 | 11/2004 | Strysko |
| 2005/0024179 A1 | 2/2005 | Chandrasekaran et al. |
| 2005/0046404 A1 | 3/2005 | Uusitalo |
| 2005/0245658 A1 | 11/2005 | Mehrotra et al. |
| 2005/0254266 A1 | 11/2005 | Jitaru |
| 2005/0281058 A1 | 12/2005 | Batarseh et al. |
| 2006/0006976 A1 | 1/2006 | Bruno |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0109698 A1 | 5/2006 | Qu |

| | | |
|---|---|---|
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0237968 A1 | 10/2006 | Chandrasekaran |
| 2006/0255360 A1 | 11/2006 | Brar et al. |
| 2007/0007945 A1 | 1/2007 | King et al. |
| 2007/0045765 A1 | 3/2007 | Brar et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1* | 5/2007 | Zhang et al. ............... 363/21.12 |
| 2007/0159857 A1 | 7/2007 | Lee |
| 2007/0222463 A1 | 9/2007 | Qahouq et al. |
| 2007/0241721 A1 | 10/2007 | Weinstein et al. |
| 2007/0296028 A1 | 12/2007 | Brar et al. |
| 2007/0298559 A1 | 12/2007 | Brar et al. |
| 2007/0298564 A1 | 12/2007 | Brar et al. |
| 2008/0024259 A1 | 1/2008 | Chandrasekaran et al. |
| 2008/0054874 A1 | 3/2008 | Chandrasekaran et al. |
| 2008/0080219 A1 | 4/2008 | Sohma |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1 | 6/2008 | Beasley |
| 2008/0150666 A1 | 6/2008 | Chandrasekaran et al. |
| 2008/0205104 A1 | 8/2008 | Lev et al. |
| 2008/0224812 A1 | 9/2008 | Chandrasekaran |
| 2008/0232141 A1 | 9/2008 | Artusi et al. |
| 2008/0298106 A1 | 12/2008 | Tateishi |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0027926 A1* | 1/2009 | Yang et al. ................. 363/21.14 |
| 2009/0046486 A1 | 2/2009 | Lu |
| 2009/0097290 A1 | 4/2009 | Chandrasekaran |
| 2009/0109711 A1* | 4/2009 | Hsu ............................ 363/21.14 |
| 2009/0257250 A1* | 10/2009 | Liu ............................. 363/21.06 |
| 2009/0273957 A1 | 11/2009 | Feldtkeller |
| 2009/0284994 A1 | 11/2009 | Lin et al. |
| 2009/0315530 A1 | 12/2009 | Baranwal |
| 2010/0091522 A1 | 4/2010 | Chandrasekaran |
| 2010/0123486 A1 | 5/2010 | Berghegger |
| 2010/0149838 A1 | 6/2010 | Artusi |
| 2010/0182806 A1 | 7/2010 | Garrity |
| 2010/0188876 A1 | 7/2010 | Garrity |
| 2010/0254168 A1 | 10/2010 | Chandrasekaran |
| 2010/0321958 A1 | 12/2010 | Brinlee |
| 2010/0321964 A1 | 12/2010 | Brinlee |
| 2011/0038179 A1 | 2/2011 | Zhang |
| 2011/0134664 A1 | 6/2011 | Berghegger |
| 2011/0149607 A1 | 6/2011 | Jungreis |
| 2011/0182089 A1 | 7/2011 | Genannt Berghegger |
| 2011/0239008 A1 | 9/2011 | Lam et al. |
| 2011/0305047 A1 | 12/2011 | Jungreis et al. |
| 2012/0243271 A1 | 9/2012 | Berghegger |
| 2012/0294048 A1 | 11/2012 | Brinlee |

FOREIGN PATENT DOCUMENTS

| | | |
|---|---|---|
| EP | 0 665 634 A1 | 8/1995 |
| JP | 57097361 | 6/1982 |
| JP | 3-215911 | 9/1991 |
| JP | 2000-68132 | 3/2000 |
| WO | WO8700991 | 2/1987 |
| WO | WO 2010/083511 A1 | 7/2010 |
| WO | WO 2010/083514 A1 | 7/2010 |
| WO | WO 2010/114914 A1 | 10/2010 |
| WO | WO 2011/116225 A1 | 9/2011 |

OTHER PUBLICATIONS

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET," AN101A.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.

Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.

Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.

Chhawchharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.

Curtis, K., "Advances in Microcontroller Peripherals Facilitate Current-Mode for Digital Power Supplies," Digital Power Forum '06, 4 pp., Sep. 2006, Darnell Group, Richardson, TX.

Eisenbeiser, K., et al., "Manufacturable GaAs VFET for Power Switching Applications," IEEE Electron Device Letters, Apr. 2000, pp. 144-145, vol. 21, No. 4, IEEE.

Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.

Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.

Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.

Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.

Kollman, R., et al., "10 MHz PWM Converters with GaAs VFETs," IEEE 11th Annual Applied Power Electronics Conference and Exposition, Mar. 1996, pp. 264-269, vol. 1, IEEE.

Kuwabara, K., et al., "Switched-Capacitor DC—DC Converters," Fujitsu Limited, IEEE, 1988, Kawasaki, Japan, pp. 213-218.

Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.

Lenk, R., "Introduction to the Tapped Buck Converter," PCIM 2000, HFPC 2000 Proceedings, Oct. 2000, pp. 155-166.

Liu, W., "Fundamentals of III-V Devices: HBTs, MESFETs, and HFETs/HEMTs," §5-5: Modulation Doping, 1999, pp. 323-330, John Wiley & Sons, New York, NY.

Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.

Maxim, Application Note 725, www.maxim-ic.com/an725, Maxim Integrated Products, Nov. 29, 2001, 8 pages.

Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.

Miwa, B.A., et al., "High Efficiency Power Factor Correction Using Interleaving Techniques," IEEE Proceedings of APEC, 1992, pp. 557-568, IEEE, Los Alamitos, CA.

National Semiconductor Corporation, "LMC7660 Switched Capacitor Voltage Converter," www.national.com, Apr. 1997, 12 pages.

National Semiconductor Corporation, "LM2665 Switched Capacitor Voltage Converter," www.national.com, Sep. 2005, 9 pages.

Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.

Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.

Peng, C., et al., "A New Efficient High Frequency Rectifier Circuit," Proceedings of 1991 High Frequency Power Conversion (HFPC '91) Conference, Jun. 1991, pp. 236-243, Toronto, CA.

Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.

Plumton, D.L., et al., "A Low On-Resistance High-Current GaAs Power VFET," IEEE Electron Device Letters, Apr. 1995, pp. 142-144, vol. 16, No. 4, IEEE.

Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.

Rico, M., et al., "Static and Dynamic Modeling of Tapped-Inductor DC-to-DC Converters," pp. 281-288, IEEE, Los Alamitos, CA.

Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.

Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.

Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.

Texas Instruments Incorporated, "LT1054, LT1054Y Switched-Capacitor Voltage Converters With Regulators," SLVS033C, Feb. 1990—Revised Jul. 1998, 25 pages.

Thaker, M., et al., "Adaptive/Intelligent Control and Power Management Reduce Power Dissipation and Consumption," Digital Power Forum '06, 11 pp., Sep. 2006, Darnell Group, Richardson, TX.

Vallamkonda, S., "Limitations of Switching Voltage Regulators," A Thesis in Electrical Engineering, Texas Tech University, May 2004, 89 pages.

Wei, J., et al., "Comparison of Three Topology Candidates for 12V VRM," IEEE APEC, 2001, pp. 245-251, IEEE, Los Alamitos, CA.

Weitzel, C.E., "RF Power Devices for Wireless Communications," 2002 IEEE MTT-S CDROM, 2002, pp. 285-288, paper TU4B-1, IEEE, Los Alamitos, CA.

Williams, R., "Modern GaAs Processing Methods," 1990, pp. 66-67, Artech House, Inc., Norwood, MA.

Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.

Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.

Xu, P., et al., "Design and Performance Evaluation of Multi-Channel Interleaved Quasi-Square-Wave Buck Voltage Regulator Module," HFPC 2000 Proceedings, Oct. 2000, pp. 82-88.

Xu, P., et al., "Design of 48 V Voltage Regulator Modules with a Novel Integrated Magnetics," IEEE Transactions on Power Electronics, Nov. 2002, pp. 990-998, vol. 17, No. 6, IEEE, Los Alamitos, CA.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Freescale Semiconductor, "Implementing a Digital AC/DC Switched-Mode Power Supply using a 56F8300 Digital Signal Controller," Application Note AN3115, Aug. 2005, 24 pp., Chandler, AZ.

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Freescale Semiconductor, "56F8323 Evaluation Module User Manual, 56F8300 16-bit Digital Signal Controllers", MC56FS323EVMUM, Rev. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

Power Integrations, Inc., "TOP200-4/14 TOPSwitch® Family Three-terminal Off-line PWM Switch," Internet Citation http://www.datasheet4u.com/.download.php?id=311769, Jul. 1996, XP002524650, pp. 1-16.

* cited by examiner

CONTROLLER FOR A POWER CONVERTER

This application claims the benefit of U.S. Provisional Application No. 61/145,654, entitled "Controller for a Synchronous Rectifier Switch and Power Converter Employing the Same," filed on Jan. 19, 2009, which application is incorporated herein by reference.

TECHNICAL FIELD

The present invention is directed, in general, to power electronics and, more specifically, to controller for a power converter and method of operating the same.

BACKGROUND

A switched-mode power converter (also referred to as a "power converter" or "regulator") is a power supply or power processing circuit that converts an input voltage waveform into a specified output voltage waveform. DC-DC power converters convert a direct current ("dc") input voltage into a dc output voltage. Controllers associated with the power converters manage an operation thereof by controlling the conduction periods of power switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of the power switches of the power converter. The duty cycle is a ratio represented by a conduction period of a power switch to a switching period thereof. Thus, if a power switch conducts for half of the switching period, the duty cycle for the power switch would be 0.5 (or 50%). Additionally, as the voltage or the current for systems, such as a microprocessor powered by the power converter, dynamically change (e.g., as a computational load on the microprocessor changes), the controller should be configured to dynamically increase or decrease the duty cycle of the power switches therein to maintain an output characteristic such as an output voltage at a desired value.

To produce a dc output voltage, the power converters often employ diodes to rectify an alternating current ("ac") voltage produced across a secondary winding of a transformer. The power converter may also employ a diode to provide a current path to provide continuity for a current in an inductor such as an output filter inductor. The aforementioned diode that provides the current path for inductor current continuity is frequently referred to as a "freewheeling diode." The rectifying and freewheeling devices can introduce a power loss component in a power converter due to the forward voltage drop across the diode, particularly in a power converter that produces an output voltage of five volts or less. Schottky diodes, which have a relatively low forward voltage drop, are often employed in low-voltage power converter applications to reduce a diode forward voltage drop. However, the passive rectifying devices such as Schottky diodes, typically, cannot achieve forward voltage drops of less than about 0.35 volts, thereby limiting a conversion efficiency of the dc-dc power converter.

To achieve an acceptable level of efficiency, dc-dc power converters that provide low output voltages (e.g., 1 volt) often employ rectifying devices that have forward voltage drops of less than about 0.1 volts. To provide such further reduction of power loss, an active semiconductor switch such as a metal-oxide semiconductor field-effect transistor ("MOSFET"), which provides a resistive voltage drop, is often employed to replace the diode. An active semiconductor switch, however, must be periodically driven into conduction and non-conduction modes or states in synchronism with a periodic waveform of an ac voltage (e.g., an ac voltage produced across a secondary winding of a transformer). The active semiconductor switches may thereby avoid the higher forward voltage drops inherent in the passive rectifying devices. A design issue introduced by substituting an active semiconductor switch for a diode is the need to provide a drive signal therefor that is accurately synchronized with the operation of the power converter to control the conduction and non-conduction modes or states of the active semiconductor switches and that avoids conduction overlap with other active semiconductor switches. An active semiconductor switch substituted for a diode in a power converter is generally referred to as a "synchronous rectifier" or "synchronous rectifier switch."

U.S. Pat. No. 6,060,943, entitled "Circuit Simulating a Diode" to Jansen, issued May 9, 2000 and U.S. Pat. No. 6,469,564, entitled "Circuit Simulating a Diode" to Jansen, issued Oct. 22, 2002, both of which are incorporated herein by reference, are directed to circuits that perform the function of a diode to conduct current in one direction with a low forward voltage drop, but block current in the other direction to produce an improved rectification function. When the voltage at a designated anode terminal of the circuit is higher than the voltage at a designated cathode terminal, a forward current flows. When the polarity of the voltage at these designated terminals is reversed, the current is interrupted.

A number of further circuit design techniques are known in the art to provide a drive signal for a synchronous rectifier. For example, U.S. Pat. No. 5,303,138, entitled "Low Loss Synchronous Rectifier for Application to Clamped-Mode Power Converters," to Rozman, issued Apr. 12, 1994, which is incorporated herein by reference, discloses that a gate of a synchronous rectifier applied to an active-clamp of a power converter may be driven by a terminal of a secondary winding of a transformer. As described in U.S. Pat. No. 6,288,920, entitled "Drive Compensation Circuit for Synchronous Rectifier and Method of Operating the Same," to Jacobs, et al., issued Sep. 11, 2001, which is incorporated herein by reference, a drive circuit employing a diode and a capacitor coupled in series with a secondary winding of a transformer is constructed to drive the gate of a synchronous rectifier. As described in U.S. Pat. No. 6,831,847, entitled "Synchronous Rectifier Drive Circuit and Power Supply Including Same," to Perry, issued Dec. 14, 2004, which is incorporated herein by reference, a drive circuit for a synchronous rectifier is formed with a turn-on switch, a turn-off switch, a charge pump, and a pulse transformer.

Additionally, synchronous rectifier design techniques are described in "Power Supply Cookbook," second edition, by Marty Brown, which is incorporated herein by reference. As described by Brown in section 3.6.2 therein, FIGUREs (a) and (c) show synchronous rectifiers driven by a primary side switching circuit with a direct connection as in FIGURE (a), and by means of a transformer in FIGURE (c). FIGURE (b) of Brown shows synchronous rectifiers driven directly by the output voltage of a transformer. Thus, as described in the references, a particular power conversion topology including an active clamp may be employed to drive a control terminal of an active semiconductor switch employed as a synchronous rectifier, or an additional transformer winding may be employed for the same.

Each of these approaches, however, provides an efficiency and/or a cost constraint that limits or otherwise penalizes the use of a synchronous rectifier in a many applications. Accordingly, what is needed in the art is a controller for a synchronous rectifier in a power converter and related method that avoids the deficiencies in the prior art.

SUMMARY OF THE INVENTION

These and other problems are generally solved or circumvented, and technical advantages are generally achieved, by advantageous embodiments of the present invention, including a controller for a power converter having a transformer with a primary winding coupled to a power switch and a secondary winding coupled to a synchronous rectifier switch. In one embodiment, the controller includes a first controller configured to control a conductivity of the power switch, and a first delay circuit configured to delay an initiation of the conductivity of the power switch. The controller also includes a second controller configured to control a conductivity of the synchronous rectifier switch as a function of a voltage difference between two terminals thereof, and a second delay circuit configured to delay an initiation of the conductivity of the synchronous rectifier switch. The controller still further includes a shutdown circuit configured to substantially disable conductivity of the synchronous rectifier switch before the initiation of conductivity of the power switch.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a power converter including a power switch and a synchronous rectifier switch constructed to operate with substantially non-overlapping periods of conductivity, and a method of operating the same. While the principles of the present invention will be described in the environment of a power converter, any application that may benefit from a controller such as a power amplifier or a motor controller is well within the broad scope of the present invention.

A flyback power converter topology is often employed in low-power applications such as for a notebook personal computer because of its simplicity and low cost. The forward voltage drop of a rectifying diode on the secondary side of a transformer of the power converter results in significant power losses, which makes it difficult to meet high power conversion efficiency objectives such as the ENERGY STAR EPA 4.0 efficiency standard. The aforementioned limitations may be alleviated by applications of the principles of the present invention to the flyback power converter and other converter topologies as well.

Figure 1:
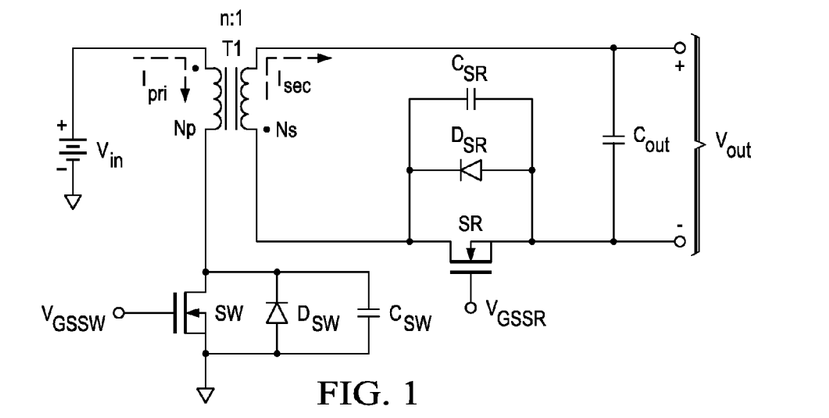
FIG. 1 illustrates a schematic diagram of an embodiment of portions of a flyback power converter that provides an environment for application of the present invention.

Turning now to FIG. 1, illustrated is a schematic diagram of an embodiment of portions of a flyback power converter that provides an environment for application of the present invention. To reduce power loss, synchronous rectifier switch SR (e.g., an active semiconductor switch such as a MOSFET switch) has been used to replace the rectifying diode normally used on the secondary side of the transformer in this power converter topology. The power train of the power converter includes a power switch SW coupled to a dc input power source at an input thereof that provides an input voltage $V_{in}$. The dc input power source supplies input power at the input voltage $V_{in}$ to a transformer T1 with a turns ratio n:1. The transformer T1 has Np primary turns and Ns secondary turns that are selected to provide an output voltage $V_{out}$ with consideration of a resulting duty cycle and stress on the power train components. The power switch SW (e.g., an n-channel MOSFET) is controlled by a controller such as a pulse-width modulation controller (not shown) that controls the power switch SW to be conducting for a duty cycle D with a switching frequency $f_s$. The duty cycle D is adjusted by the pulse-width modulation controller to regulate a characteristic of the output of the power converter such as an output voltage, an output current, or a combination of the two. The ac voltage appearing on the secondary winding of the transformer T1 is rectified by the synchronous rectifier SR coupled to the output through the output filter capacitor Cout to produce the output voltage $V_{out}$.

During the first portion of a duty cycle D when the power switch SW conducts, a primary current $I_{pri}$ flowing through the primary winding of transformer T1 increases as current flows from the input through the power switch SW and the magnetizing inductance of transformer T1. During a complementary portion of the duty cycle (generally co-existent with a complementary duty cycle "1-D" of the power switch SW), the power switch SW is transitioned to a non-conducting state in response to the gate drive signal $V_{GSSW}$ and the synchronous rectifier switch SR coupled to the output filter capacitor Cout is enabled to conduct in response to the gate drive signal $V_{GSSR}$. The synchronous rectifier switch SR provides a path to maintain a continuity of current flowing in the magnetizing inductance of the transformer T1. During the complementary portion of the duty cycle 1-D, the current flowing through the magnetizing inductance of the transformer T1 decreases. In general, during the first portion of the duty cycle D, the duty cycle of the power switch SW and the synchronous rectifier switch SR may be adjusted to maintain a regulation of the output voltage $V_{out}$ of the power converter. Those skilled in the art should understand, however, that the conduction periods or conductivity for the power switch SW and the synchronous rectifier switch SR may be separated by a small time interval to avoid cross conduction therebetween and beneficially to reduce the power switching losses associated with the power converter. As illustrated in FIG. 1, the power switch SW and the synchronous rectifier switch SR each include body diodes represented by diodes $D_{SW}$ and $D_{SR}$, respectively, and parasitic source-to-drain capacitance represented by capacitors $C_{SW}$ and $C_{SR}$, respectively.

Figure 2:
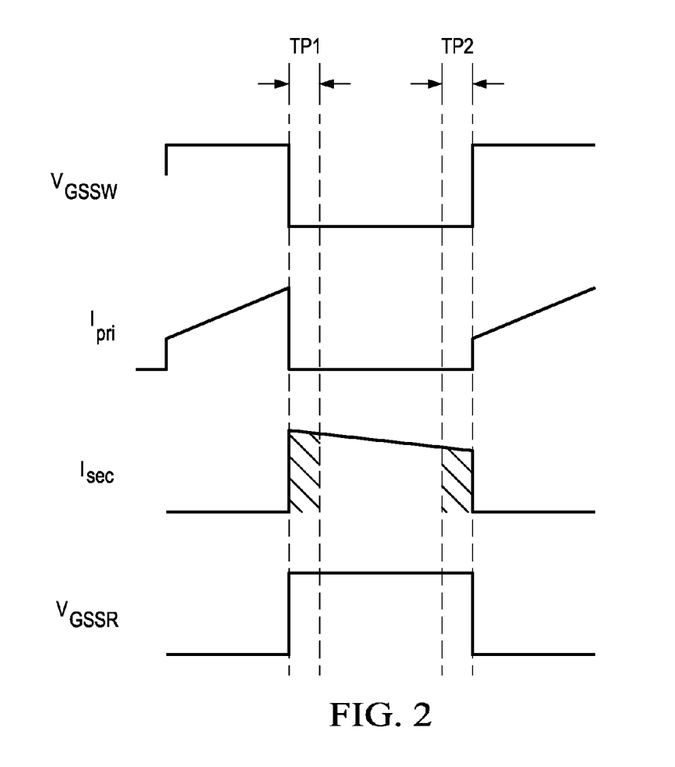
FIG. 2 illustrates graphical diagrams demonstrating operating characteristics of a flyback power converter in accordance with the principles of the present invention.

Turning now to FIG. 2, illustrated are graphical diagrams demonstrating operating characteristics of a flyback power converter in accordance with the principles of the present invention. With continuing reference to FIG. 1, the diagrams illustrate gate drive waveforms $V_{GSSW}$, $V_{GSSR}$ associated with a the power switch SW and the synchronous rectifier switch SR, respectively, a primary current $I_{pri}$ in the primary winding of the transformer T1, and a secondary current $I_{sec}$ in the secondary winding of the transformer T1. To prevent a current shoot-through condition for the power switch SW (i.e., to prevent a condition wherein the power switch SW and the synchronous rectifier switch SR are enabled to conduct at the same time), the conduction periods or conductivity of the switches ideally should not overlap. As illustrated in FIG. 2, to avoid simultaneous conduction of the power switch SW and the synchronous rectifier switch SR, appreciable time delays TP1, TP2 in the gate drive waveforms $V_{GSSW}$, $V_{GSSR}$ (e.g., 50 nanoseconds illustrated by the cross-hatched areas in the FIGURE) are introduced between the turn-off instant of the power switch SR and the turn-on instant of the synchronous rectifier switch SR as well as between the turn-off instant of the power switch SW and the turn-on instant of the synchronous rectifier switch SR of the flyback power converter.

Several commercial integrated circuit ("IC") drivers have been developed for application to synchronous rectifiers in flyback power converters. Typical synchronous rectifier integrated circuit drivers include the STSR3 IC driver produced by STMicroelectronics of Geneva, Switzerland, the IR1167 IC driver produced by International Rectifier of El Segundo, Calif., the TEA1761 IC driver produced by Royal Philips Electronics of the Netherlands, and others. The synchronous rectifier integrated circuit drivers are not only more expensive than circuits constructed with discrete components, but also introduce further circuit deficiencies and, thus, cannot meet the high performance and low cost requirements of notebook computer markets and other applications. For example, the STSR3 IC driver can produce a gate-drive voltage only up to 5.5 volts ("V"). As a result, the practical gate voltage of the driven synchronous rectifier MOSFET can only be as high as 5.0 V, which is insufficient to adequately reduce the synchronous rectifier switch on-resistance. As a result, the power loss in the synchronous rectifier is not sufficiently reduced when viewed against the potential power loss reduction if the synchronous rectifier switch were properly driven.

The turn-off signal of the synchronous rectifier switch SR is usually not generated on the primary side of the flyback power converter, but is produced by a time rate of change of a voltage of the secondary winding of the transformer T1. Therefore, a controlled time delay is not provided between turning off the synchronous rectifier switch SR and turning on the power switch SW. As a result, the flyback power converter does not operate efficiently and may produce a shoot-through current in a continuous conduction mode. Although the IR1167 and TEA1761 IC drivers can produce a gate voltage up to 20 V similar to the STSR3 IC driver, both synchronous rectifier integrated circuit drivers rely on a time rate of change of a secondary winding of the transformer T1 to trigger turn-off of the synchronous rectifier switch SR. Thus, for reliable operation of a flyback power converter that includes a synchronous rectifier switch SR, it is important to provide the turn-off signal for the synchronous rectifier switch SR from the primary side of the transformer T1 so that conduction delays associated with the synchronous rectifier switch SR can be properly controlled.

Thus, a flyback power converter constructed with a prior-art driver for a synchronous rectifier will not provide sufficient reliability, and may produce a substantial shoot-through current in a continuous conduction mode. These limitations are encountered because both turn-on and turn-off of a synchronous rectifier switch SR are generated from a voltage on the secondary side of the transformer T1. A voltage produced on the secondary side of the transformer T1 does not provide reasonably controlled dead times between the turn-off instant of the primary-side power switch SW and the turn-on instant of the secondary-side synchronous rectifier switch SR.

Figure 3:
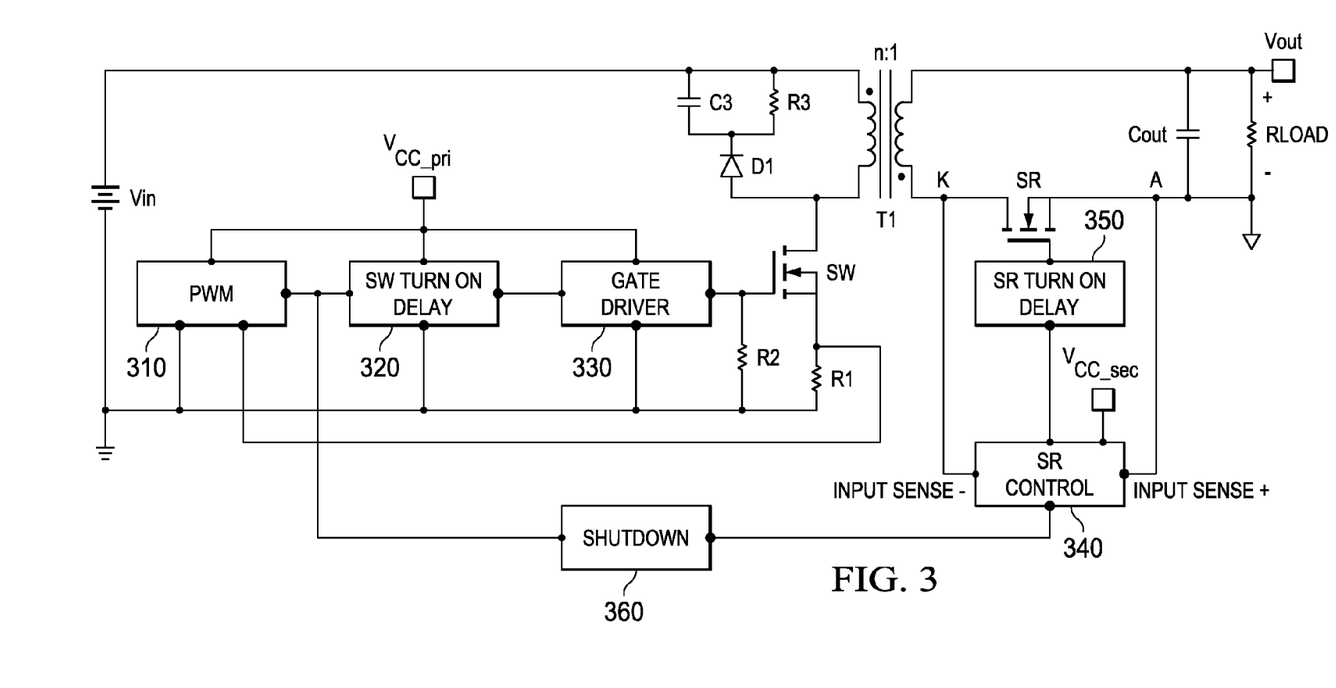
FIGS. 3 and 4 illustrate schematic diagrams of embodiments of flyback power converters including a controller for a synchronous rectifier constructed according to the principles of the present invention.

Turning now to FIG. 3, illustrated is a schematic diagram of an embodiment of a flyback power converter including a controller for a synchronous rectifier constructed according to the principles of the present invention. A dc input power source supplies input power at the input voltage $V_{in}$ to a transformer T1 that is coupled to a first switch or a power switch SW (e.g., an n-channel MOSFET). On a secondary-side of transformer T1, a second switch or a synchronous rectifier switch SR (e.g., an n-channel MOSFET) rectifies an ac voltage at the secondary winding of the transformer T1, and the resulting waveform is filtered by an output filter capacitor Cout. A resistor RLOAD represents a load coupled to output terminals of the flyback power converter. A reset circuit including a capacitor C3, a resistor R3, and a diode D1 provide a dissipative reset function for the transformer T1.

As illustrated in FIG. 3, a first controller or a pulse-width modulation controller 310 (designated "PWM") produces or generates a control signal or waveform to control a duty cycle or conductivity of the power switch SW. The waveform produced by the pulse-width modulation controller 310 is delayed by a first delay circuit or power switch delay circuit 320 (designated "SW TURN ON DELAY"), the output of which is coupled to a gate driver 330 (designated "GATE DRIVER") to drive the gate of the power switch SW. In other words, the power switch delay circuit 320 is configured to delay an initiation of the conductivity of the power switch SW. The turn-on delay function is included to avoid cross conduction of the power switch SW and the synchronous rectifier switch SR. The pulse-width modulation controller 310, the power switch delay circuit 320, and the gate driver 330 are powered from a primary bias voltage source (designated "$V_{CC\_pri}$").

The conductivity of the synchronous rectifier switch SR is controlled by a second controller or a synchronous rectifier controller 340 (designated "SR CONTROL") that senses the voltage across the switched terminals of the synchronous rectifier switch SR. When the voltage at the node A is lower than the voltage at the node K (referred to as an "INPUT SENSE"), the synchronous rectifier controller 340 disables conductivity of the synchronous rectifier switch SR. When the voltage at the node (or terminal) A is higher than the voltage at the node (or terminal) K, conductivity is enabled. A second delay circuit or a synchronous rectifier delay circuit 350 (designated "SR TURN ON DELAY") delays the control signal for the synchronous rectifier switch SR to avoid cross conduction with the power switch SW. In other words, the synchronous rectifier delay circuit is configured to delay an initiation of the conductivity of the synchronous rectifier switch SR. The synchronous rectifier controller 340 is powered from a secondary bias voltage source (designated $V_{CC\_sec}$"). In an alternative embodiment, the synchronous rectifier controller 340 may be powered from an output terminal of the flyback power converter, employing a voltage dropping circuit mechanism, such as a Zener diode or linear regulator, as may be necessary. Additionally, a shutdown circuit 360 (designated SHUTDOWN") is included to provide an anticipatory signal to the synchronous rectifier controller 340 so that conductivity of the synchronous rectifier switch SR can be disabled before conductivity of the power switch SW is initiated or enabled.

The synchronous rectifier control process introduced herein for a flyback power converter provides a mechanism to substantially eliminate cross conduction between a power switch SW on the primary-side thereof and a synchronous rectifier switch SR on the secondary-side thereof. After the primary switch SW is turned off, the input sense of the synchronous rectifier switch SR swings from a high potential to a low potential, and a body diode of the synchronous rectifier switch SR conducts. The downward slope of the input sense is detected that triggers a time delay circuit (e.g., the synchronous rectifier delay circuit 350). After a certain programmed time delay, a control signal is produced and turns on the synchronous rectifier switch SR.

When the pulse-width modulation controller 310 generates a signal to turn on the power switch SW, this signal traverses the boundary between the primary side and secondary side of the transformer T1 to turn off the synchronous rectifier switch SR on the secondary side of the transformer T1. Then, after a programmable time delay, the pulse-width modulation controller 310 in conjunction with the power switch delay circuit 320 turns on the power switch SW in conjunction with the gate driver 330.

Figure 4:
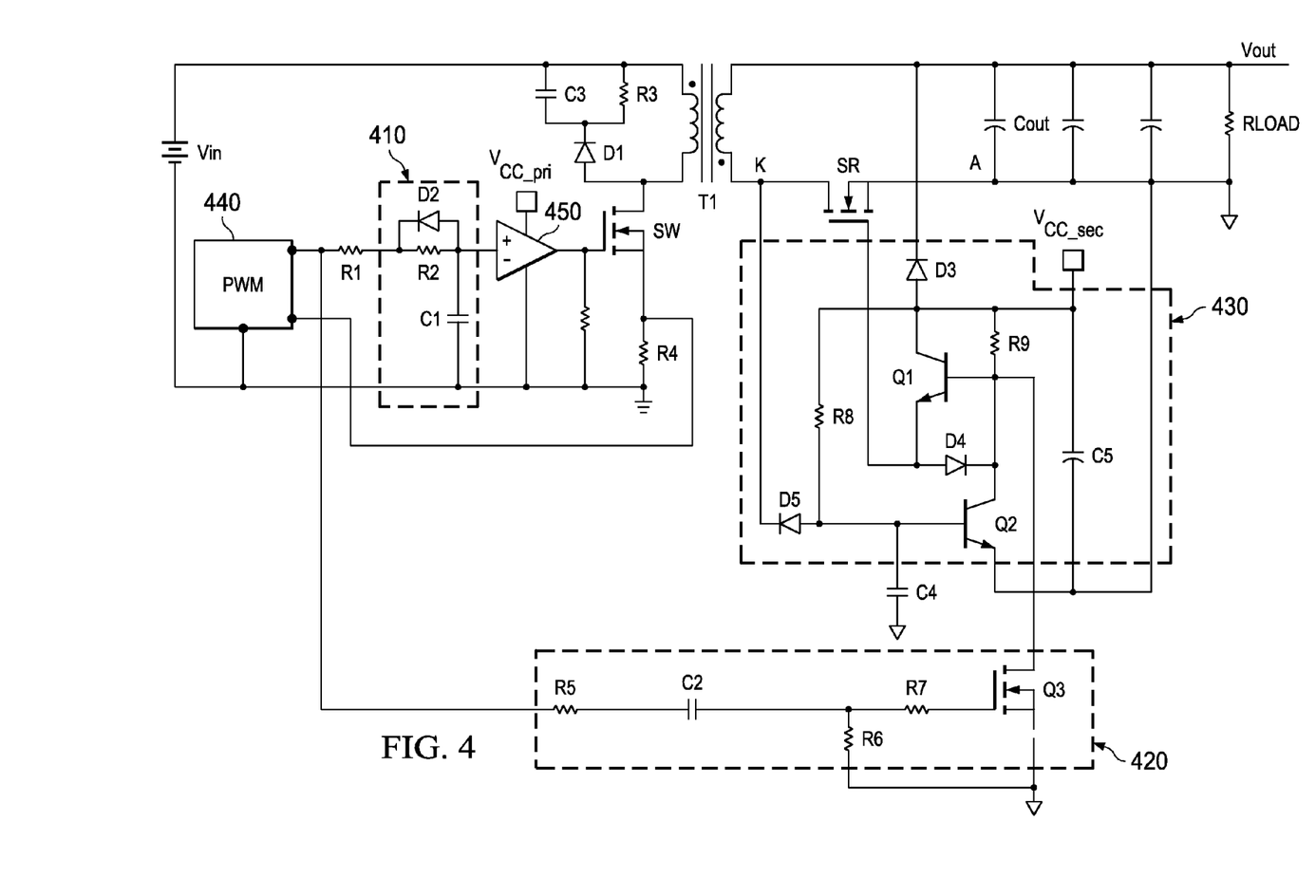

Turning now to FIG. 4, illustrated is a schematic diagram of an embodiment of a flyback power converter including a controller for a synchronous rectifier constructed according to the principles of the present invention. The flyback power converter includes a first delay circuit or a primary-side power switch delay circuit 410 including a diode D2, a resistor R2 and a capacitor C1. The flyback power converter further includes a shutdown circuit 420 including resistors R5, R6, R7, a capacitor C2, and switch Q3 (e.g., an n-channel MOSFET). The flyback power converter further includes a second delay circuit including a synchronous rectifier delay capacitor C4. A synchronous rectifier controller 430 is formed with resistors R8, R9, a capacitor C5, diodes D3, D4, D5, and npn bipolar transistors Q1, Q2, coupled to a synchronous rectifier switch SR.

In operation, the secondary-side synchronous rectifier switch SR is first turned off, and after a brief time delay, the primary-side power switch SW begins to turn on. The primary-side power switch SW turns off first, and after a delay, the secondary-side synchronous rectifier switch SR begins to turn on. The delay times can be programmed by changing component parameter values in the power switch delay circuit 410 and the synchronous rectifier delay capacitor C4.

The synchronous rectifier controller 430 illustrated in FIG. 4 includes an amplifier formed with bipolar transistor Q2 with its collector coupled to a secondary bias voltage source (designated $V_{CC\_sec}$"). When a body diode (not shown) of synchronous rectifier switch SR is forward biased, a voltage of a node K becomes negative with respect to a voltage of a node A, which is coupled to secondary circuit ground. The negative voltage at the node K is coupled through diode D5 to the base of bipolar transistor Q2, which turns off this transistor. The positive voltage thereby produced at the collector of bipolar transistor Q2 back biases diode D4, and a positive voltage is coupled through bipolar transistor Q1 to the gate of the synchronous rectifier switch SR, turning it on.

When the body diode of the synchronous rectifier switch SR is back biased, the inverse operation occurs, wherein the voltage of the gate of the synchronous rectifier switch SR is reduced by the circuit to a sufficiently low voltage to disable its conductivity. The synchronous rectifier delay capacitor C4 provides a mechanism to delay turn on of the synchronous rectifier switch SR. The shutdown circuit 420 is coupled to the bipolar transistor Q1 to enable a pulse-width modulation controller 440 (designated "PWM"), in cooperation with the power switch delay circuit 410 and a gate driver 450, on the primary side of the transformer T1 to disable conductivity of the synchronous rectifier switch SR before conductivity is enabled in the power switch SW.

Figure 5:
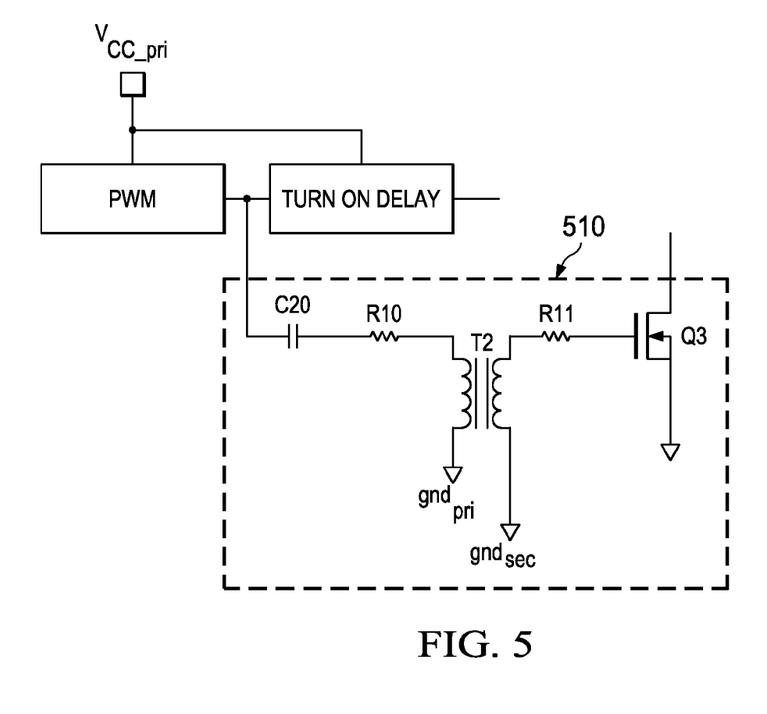
FIG. 5 illustrates a schematic diagram of an embodiment of a shutdown circuit employable with a controller constructed according to the principles of the present invention.

Turning now to FIG. 5, illustrated is a schematic diagram of an embodiment of a shutdown circuit or a synchronous rectifier shutdown circuit 510 including resistors R10, R11, a capacitor C20, a transformer T2, and n-channel MOSFET Q3 constructed according to the principles of the present invention. The shutdown circuit 510 illustrates respectively primary and secondary ground terminals $gnd_{pri}$, $gnd_{sec}$ showing separation of the primary and secondary sides of the transformer T2. The capacitor C20 is included in the shutdown circuit 510 to prevent a dc bias current from flowing in the transformer T2. The shutdown circuit 510 is an alternative to the shutdown circuit 420 illustrated in FIG. 4 that employs transformer T2 to span the primary-to-secondary isolation boundary in place of the capacitor C2 illustrated in FIG. 4.

Thus, a power converter such as a flyback power converter has been introduced that is operable in a continuous conduction mode with circuit elements as set forth below. The power converter includes a primary-side turn-on delay circuit for a power switch (also referred to as a "first delay circuit or a power switch delay circuit"), a secondary-side turn-on delay circuit for a synchronous rectifier switch (also referred to as a "second delay circuit or a synchronous rectifier delay circuit"), and a shut-down circuit for a synchronous rectifier switch on the secondary side, the action of which is initiated from the primary side. A driver (e.g., a gate driver) may be advantageously included in the power converter following the primary-side turn-on delay circuit.

The gate driver on the primary side can be formed with discrete components including two transistors connected in a series totem-pole arrangement. Alternatively, a commercial integrated circuit driver may be employed. The bias voltage source for the synchronous rectifier on the secondary side of the power converter may be obtained directly from an output voltage terminal of the power converter if the output voltage is less than, for instance, 10 V. The bias voltage source may be obtained from an output voltage terminal of the power converter through a Zener diode and a resistor if the output voltage is higher than, for instance, 10 V. The bias voltage source on the secondary side may also be obtained from an independent bias voltage supply circuit such as a linear regulator.

In one embodiment, a controller for a power converter includes a first controller configured to control a conductivity of a first switch (e.g., a metal-oxide semiconductor field-effect transistor), and a first delay circuit (e.g., a resistor parallel-coupled to a diode, and a capacitor series-coupled thereto) configured to delay an initiation of the conductivity of the first switch. The controller also includes a second controller (e.g., a plurality of resistors, capacitors and switches, or an amplifier and switch) configured to control a conductivity of a second switch (e.g., a metal-oxide semiconductor field-effect transistor) as a function of a voltage difference between two terminals thereof, and a second delay circuit (e.g., a capacitor) configured to delay an initiation of the conductivity of the second switch. A shutdown circuit (e.g., a capacitor or transformer coupled to the first controller and a switch coupled to the second controller) of the controller is configured to substantially disable conductivity of the second switch before the initiation of conductivity of the first switch. As described herein, portions of the controller (including the first and second controller) are coupled to a bias voltage source.

Those skilled in the art should understand that the previously described embodiments of a power converter including a synchronous rectifier and related methods of operating the same are submitted for illustrative purposes only. In addition, various other power converter topologies such as a forward power converter and a single ended primary inductor power converter topologies are well within the broad scope of the present invention. While a power converter including a synchronous rectifier has been described in the environment of a power converter, the synchronous rectifier may also be applied to other systems such as, without limitation, a power amplifier and a motor controller.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed:

1. A controller employable with a power converter having a transformer with a primary winding coupled to a power switch and a secondary winding coupled to a synchronous rectifier switch, comprising:
    a first controller on a primary side of said transformer and configured to control a conductivity of said power switch;
    a first delay circuit on said primary side of said transformer and configured to delay an initiation of said conductivity of said power switch in conjunction with a control signal from said first controller;
    a second controller on a secondary side of said transformer and configured to enable a conductivity of said synchronous rectifier switch responsive to a voltage difference between two terminals of said synchronous rectifier switch;
    a second delay circuit on said secondary side of said transformer and configured to delay an initiation of said conductivity of said synchronous rectifier switch after said conductivity of said power switch is disabled in conjunction with a control signal from said second controller; and
    a shutdown circuit configured to substantially disable conductivity of said synchronous rectifier switch before said initiation of conductivity of said power switch.

2. The controller as recited in claim 1 wherein said second controller is configured to enable said conductivity of said synchronous rectifier switch when a voltage of one terminal of said synchronous rectifier switch becomes higher than a voltage of another terminal of said synchronous rectifier switch as a body diode of said synchronous rectifier switch conducts.

3. The controller as recited in claim 1 wherein said first controller is a pulse-width modulation controller.

4. The controller as recited in claim 1 wherein said second controller comprises an amplifier and a switch coupled to said synchronous rectifier switch.

5. The controller as recited in claim 1 wherein said first delay circuit comprises a resistor parallel-coupled to a diode, and a capacitor series-coupled thereto, and said second delay circuit comprises a capacitor.

6. The controller as recited in claim 1 wherein said shutdown circuit comprises a capacitor coupled to said first controller and a switch coupled to said second controller.

7. The controller as recited in claim 1 wherein said shutdown circuit comprises a transformer coupled to said first controller and a switch coupled to said second controller.

8. The controller as recited in claim 1 wherein portions of said second controller are coupled to a bias voltage source.

9. A method of operating a controller employable with a power converter having a transformer with a primary winding coupled to a power switch and a secondary winding coupled to a synchronous rectifier switch, comprising:
    controlling a conductivity of said power switch with a first controller on a primary side of said transformer;
    delaying an initiation of said conductivity of said power switch in conjunction with a control signal from said first controller with a first delay circuit on said primary side of said transformer;
    enabling a conductivity of said synchronous rectifier switch responsive to a voltage difference between two terminals of said synchronous rectifier switch with a second controller on a secondary side of said transformer;
    delaying an initiation of said conductivity of said synchronous rectifier switch after said conductivity of said power switch is disabled in conjunction with a control signal from said second controller with a second delay circuit on said secondary side of said transformer; and
    substantially disabling conductivity of said synchronous rectifier switch before said initiation of conductivity of said power switch.

10. The method as recited in claim 9 wherein said delaying said initiation of said conductivity of said power switch comprises delaying said control signal from said first controller.

11. The method as recited in claim 9 wherein said enabling said conductivity of said synchronous rectifier switch comprises enabling said conductivity of said synchronous rectifier switch when a voltage of one terminal of said synchronous rectifier switch becomes higher than a voltage of another terminal of said synchronous rectifier switch as a body diode of said synchronous rectifier switch conducts.

12. The method as recited in claim 9 wherein said substantially disabling conductivity of said synchronous rectifier switch comprises providing an anticipatory signal so that conductivity of said synchronous rectifier switch is disabled before conductivity of said power switch is initiated.

13. A power converter, comprising:
   a transformer having a primary winding and a secondary winding;
   a power switch coupled to said primary winding;
   a synchronous rectifier switch coupled to said secondary winding; and
   a controller, including:
      a first controller on a primary side of said transformer and configured to control a conductivity of said power switch,
      a first delay circuit on said primary side of said transformer and configured to delay an initiation of said conductivity of said power switch in conjunction with a control signal from said first controller,
      a second controller on a secondary side of said transformer and configured enable a conductivity of said synchronous rectifier switch responsive to a voltage difference between two terminals of said synchronous rectifier switch,
      a second delay circuit on said secondary side of said transformer and configured to delay an initiation of said conductivity of said synchronous rectifier switch after said conductivity of said power switch is disabled in conjunction with a control signal from said second controller, and
      a shutdown circuit configured to substantially disable conductivity of said synchronous rectifier switch before said initiation of conductivity of said power switch.

14. The power converter as recited in claim 13 wherein said second controller is configured to enable said conductivity of said synchronous rectifier switch when a voltage of one terminal of said synchronous rectifier switch becomes higher than a voltage of another terminal of said synchronous rectifier switch as a body diode of said synchronous rectifier switch conducts.

15. The power converter as recited in claim 13 wherein said first controller is a pulse-width modulation controller and said first delay circuit includes a resistor parallel-coupled to a diode, and a capacitor series-coupled thereto.

16. The power converter as recited in claim 13 wherein said second controller includes an amplifier and a switch coupled to said synchronous rectifier switch and said second delay circuit includes a capacitor.

17. The power converter as recited in claim 13 wherein said shutdown circuit includes one of a capacitor and a transformer coupled to said first controller and a switch coupled to said second controller.

18. The power converter as recited in claim 13 wherein portions of said second controller are coupled to a bias voltage source.

19. The power converter as recited in claim 13 wherein said power converter is operable in a continuous conduction mode.

20. The power converter as recited in claim 13 further comprising a reset circuit including a capacitor, a resistor and a diode configured to provide a dissipative reset function for a transformer coupled to said power switch and said synchronous rectifier switch.

* * * * *